(12) United States Patent
Zhang et al.

(10) Patent No.: US 10,694,582 B2
(45) Date of Patent: Jun. 23, 2020

(54) APPARATUS AND METHOD FOR RADIO INTERFACE SWITCHING

(71) Applicant: Telefonaktiebolaget LM Ericsson (publ), Stockholm (SE)

(72) Inventors: Jinping Zhang, Beijing (CN); Peng Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 77 days.

(21) Appl. No.: 15/534,927

(22) PCT Filed: Dec. 16, 2014

(86) PCT No.: PCT/CN2014/093939
§ 371 (c)(1),
(2) Date: Jun. 9, 2017

(87) PCT Pub. No.: WO2016/095100
PCT Pub. Date: Jun. 23, 2016

(65) Prior Publication Data
US 2018/0270902 A1    Sep. 20, 2018

(51) Int. Cl.
*H04W 88/08* (2009.01)
*H04L 27/26* (2006.01)
*H04B 1/40* (2015.01)

(52) U.S. Cl.
CPC ............ *H04W 88/085* (2013.01); *H04B 1/40* (2013.01); *H04L 27/2615* (2013.01)

(58) Field of Classification Search
None
See application file for complete search history.

(56) References Cited

U.S. PATENT DOCUMENTS 8,823,561 B1 * 9/2014 Hammer ............... H04J 3/047 341/50
2005/0286507 A1 * 12/2005 sterling ............... H04L 7/02 370/363

(Continued)

FOREIGN PATENT DOCUMENTS

CN        1956564 A     5/2007
CN      101107871 A     1/2008
(Continued)

OTHER PUBLICATIONS

CPRI Specification v5.0; Interface Specification; Common Public Radio Interface (CPRI); Interface Specification—Sep. 21, 2011.
(Continued)

*Primary Examiner* — Ruihua Zhang
(74) *Attorney, Agent, or Firm* — Patent Portfolio Builders, PLLC (57) ABSTRACT

The disclosure relates to an RI switching apparatus and method thereof in a wireless communication network. The apparatus comprises a plurality of RI ports each connecting to a node of either a Radio Equipment Control (REC) or a Radio Equipment (RE). At least one REC and at least on RE are connected to the apparatus. The apparatus comprises a storage storing thereon a mapping relationship between one or more minimal processing and transmission units of at least one REC and one or more minimal processing and transmission units of at least one RE. When the apparatus receives data, a switcher in the apparatus switches the received data based on the mapping relationship. By appropriately configuring the mapping relationship, data transferred from an RE/REC may be switched to another REC/RE flexibly and the processing capabilities of RECs and REs can be fully used.

22 Claims, 7 Drawing Sheets

(56) References Cited

U.S. PATENT DOCUMENTS

| | | | | |
|---|---|---|---|---|
| 2011/0032910 A1* | 2/2011 | Aarflot | ......... | H04J 3/0682 |
| | | | | 370/335 |
| 2012/0176966 A1 | 7/2012 | Ling | | |
| 2013/0258848 A1 | 10/2013 | Osterling | | |
| 2014/0079037 A1* | 3/2014 | Evans | ......... | H04W 88/085 |
| | | | | 370/336 |
| 2014/0363156 A1* | 12/2014 | Gong | ......... | H04W 24/10 |
| | | | | 398/25 |

FOREIGN PATENT DOCUMENTS

| | | | |
|---|---|---|---|
| CN | 101715214 A | 5/2010 | |
| CN | 101860394 A | 10/2010 | |
| CN | 103875206 A | 6/2014 | |
| KR | 20120065054 A | 6/2012 | |
| WO | 2015/087307 A1 | 6/2015 | |

OTHER PUBLICATIONS

PCT Notification of Transmittal of the International Search Report and the Written Opinion of the International Searching Authority, or the Declaration for International application No. PCT/CN2014/093939—dated Sep. 15, 2015.

Extended European Search Report issued in application No. 14908135.8 dated Jun. 25, 2018; 11 pages.

\* cited by examiner

| | | | | | | | | | | | | | |
|---|---|---|---|---|---|---|---|---|---|---|---|---|---|
| #1 | AxC1 | AxC5 | | | | | | | | | | | |
| #2 | AxC2 | AxC6 | | | | | | | | | | | |
| #3 | AxC3 | | | | | | | | | | | | |
| #4 | AxC4 | | | | | | | | | | | | |

FIG. 6

| | | | | | | | | | | | | | |
|---|---|---|---|---|---|---|---|---|---|---|---|---|---|
| #1 | AxC0 | | | | | | | | | | | | |
| #2 | AxC1 | | | | | | | | | | | | |

FIG. 7

| | | | | | | | | | | | | | |
|---|---|---|---|---|---|---|---|---|---|---|---|---|---|
| #1 | AxC0 | AxC4 | | | | | | | | | | | |
| #2 | AxC1 | AxC5 | | | | | | | | | | | |
| #3 | AxC2 | AxC6 | | | | | | | | | | | |
| #4 | AxC3 | AxC7 | | | | | | | | | | | |

APPARATUS AND METHOD FOR RADIO INTERFACE SWITCHING

PRIORITY

This nonprovisional application is a U.S. National Stage Filing under 35 U.S.C. § 371 of International Patent Application Serial No. PCT/CN2014/093939 filed Dec. 16, 2014, and entitled "Apparatus And Method For Radio Interface Switching."

TECHNICAL FIELD

The disclosure relates to a method and apparatus in a wireless communication network, and in particular, relates to a method and apparatus of switching Radio Interfaces (RIs) between a Radio Equipment Control (REC) and a Radio Equipment (RE) of a radio base station in a wireless communication network.

BACKGROUND

Unless otherwise indicated herein, the approaches described in this section are not prior art to the claims in this disclosure and are not admitted to be prior art by inclusion in this section.

RI is the key physical interface of radio base station between an REC and an RE. The Common Public Radio Interface (CPRI) is the most successful industry cooperation defined publicly available specification for the Radio Interface (RI). A specification of the CPRI is given in Reference [1] ("Communication Public Radion Interface (CPRI); Interface Specification", CPRI Specification V5.0, Sep. 21, 2011) which is incorporated herein by reference. User plane data (IQ), control and management plane (C&M) data are transferred over this interface. With the technology development and network evolution, there are different RECs and REs that have different processing and transmission capabilities in the current radio access network. As for the processing and transmission capabilities of an REC and an RE, it can be quantitized as the amount of minimal processing and transmission units that can be processed by an REC or an RE. In the CPRI standard and other standards, such as OBSAI (Open Base Station Architecture Initiative) standard, the minimal processing and transmission unit is denoted as an Antenna-Carrier (AxC). For simplicity, the AxC amount is used in this disclosure to demonstrate the processing and transmission capabilities of an REC or an RE.

Also there are different RECs and REs that support different telecommunication standards, such as Global System for Mobile communication (GSM), Time-Division-Synchronous Code Division Multiple Access (TD-SCDMA), Wideband Code Division Multiple Access (WCDMA), Long Term Evolution (LTE) and etc.

Figure 1:
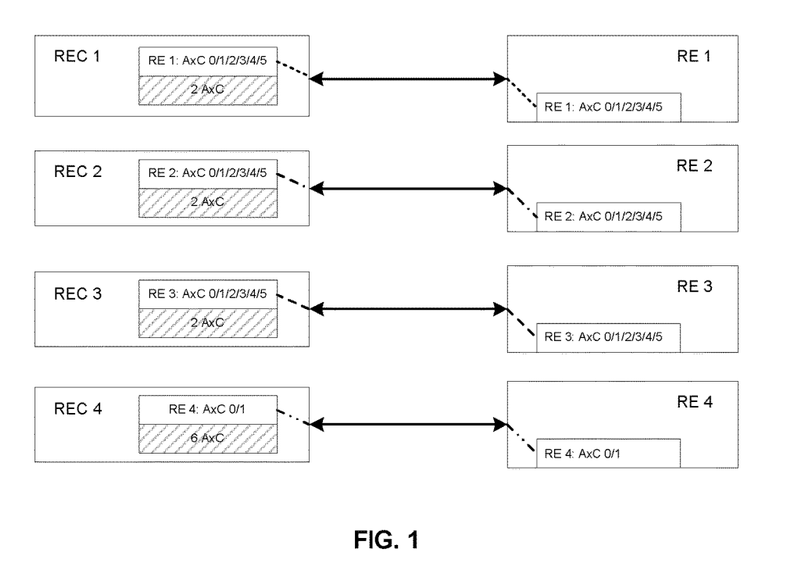
FIG. 1 shows a network topology among RECs and REs in a network.

FIG. 1 shows a network topology among RECs and REs in a network. As shown, in the radio network topology, RECs and REs are directly connected to each other even if their processing and transmission capabilities are not matched. In FIG. 1, RECs 1-4 are connected to REs 1-4, respectively, although RECs 1-4 have more processing and transmission capabilities than the connected REs 1-4. 2 AxCs of RECs 1-3 and 6 AxCs of REC 4 are not utilized with the network topology and thus part of the baseband processing and transmission capability of the network is wasted. In the case, the connection of an REC and an RE can only utilize the limited processing and transmission capabilities of the REC and the RE.

For example, when an REC with a processing and transmission capability of 8 AxCs connects to an RE with a processing and transmission capability of 6 AxCs, the REC and the RE together can only have a processing and transmission capability of 6 AxCs and the REC should waste a quarter of its processing and transmission capability. When an REC with a processing and transmission capability of 4 AxCs connects to an RE with a processing and transmission capability of 6 AxCs, the REC and the RE together can only have a processing and transmission capability of 4 AxCs and the RE should waste one third of its processing and transmission capability. Therefore, when an REC connects to an RE with different processing and transmission capabilities, the REC and the RE together can only have limited processing and transmission capabilities used. Thus, one of them cannot work with its highest processing and transmission capability and it will result in the waste of cost and efficiency.

Also, considering traditional User Equipments (UEs) will continue to exist, 2G/3G/4G networks will co-exist for a long time in order to meet the compatibility requirement from customers. Most operators occupy 2 to 3 different telecommunication standards. For example, CHINA mobile holds GSM, TD-SCDMA and TDD-LTE. An RE can only connect to an REC with the same telecommunication standard. For a cascading scenario, an RE can only be cascaded to another RE that supports the same telecommunication standard. For mix-mode cascading requirement from operators, a traditional REC can only support a single telecommunication standard and REs of different telecommunication standards will locate on the same cascading chain. It is impossible to communicate between several single-mode RECs and one mix-mode cascading chain.

Carrier Aggregation (CA) is one of the most distinct features of 4G systems including LTE-Advanced, which is being standardized in 3GPP as part of LTE Release 10. This feature allows scalable expansion of effective bandwidth delivered to a user terminal through concurrent utilization of radio resources across multiple carriers. These carriers may be of different bandwidths, and may be in the same or different bands to provide maximum flexibility in utilizing the scarce radio spectrum available to operators. If the carrier aggregation is implemented on the REC level, only REs that connect to the same REC can be used to implement carrier aggregation, and thus the benefit of carrier aggregation is not used to the most extent.

SUMMARY

An object of the disclosure is to provide an apparatus and a method which can overcome at least one of the above mentioned technical problems.

According to a first aspect, there is provided an apparatus for Radio Interface (RI) switching in a wireless communication network. The apparatus comprises a plurality of RI ports, each connecting to a node of either a Radio Equipment Control (REC) or a Radio Equipment (RE). At least one REC and at least one RE are connected to the apparatus via the RI ports. The apparatus further comprises a storage configured to store a mapping relationship between one or more minimal processing and transmission units of at least one REC and one or more minimal processing and transmission units of at least one RE. The apparatus further comprises a switcher configured to switch data received by the apparatus according to the mapping relationship. With the apparatus, a flexible mapping relationship between RECs and REs is provided. It is very easy to do network planning and network expanding with existing devices and new devices with different processing and transmission capabilities.

In one embodiment, the mapping relationship depends on the connections of respective RI ports to nodes and minimal processing and transmission unit deployment at respective RI ports. The mapping relationship is dynamically and flexibly adjustable.

In one embodiment, the apparatus further comprises a processor configured to receive information on amount of minimal processing and transmission units of respective RI ports, and calculate the mapping relationship according to the information. The apparatus thus may change the mapping relationship as required.

In one embodiment, the apparatus receives the mapping relationship from a connected REC and stores the mapping relationship in the storage. The REC calculates the mapping relationship and informs the apparatus of the calculated result.

In one embodiment, the mapping relationship is configured to keep the amount of un-mapped minimal processing and transmission units of connected REC and connected RE to a minimum. By using so configured mapping relationship, it makes the best of the processing and transmission capabilities of the connected RECs and REs. It can fully use the processing and transmission resource of RECs and REs and will improve the cost saving and resource efficiency of the whole network.

In one embodiment, the mapping relationship is configured so that more than one RI port connecting to REs that operate at the same frequency is mapped to the same RI port to which an REC is connected. By using such configured mapping relationship, it provides one way to implement logic receiving diversity.

In one embodiment, the mapping relationship is configured so that when the at least one RE does not use some minimal processing and transmission units to serve user traffic, the number of RECs whose minimal processing and transmission units are mapped to the un-used minimal processing and transmission units of the at least one RE is as much as possible. By using such configured mapping relationship, some RECs can be turned into idle/sleep mode to save power when demand of user traffic is not so much.

In one embodiment, the mapping relationship is configured so that specified minimal processing and transmission units from different REs are mapped to minimal processing and transmission units of the same REC. By using such configured mapping relationship, it provides more flexibility on carrier aggregation.

In one embodiment, the mapping relationship is configured so that data received at an RI port is switched to another RI port to which a node that supports the same telecommunication standard with the received data is connected. By using such configured mapping relationship, it provides a more flexible way on connection/cascading for difference telecommunication standards.

In one embodiment, the apparatus further comprises a clock unit configured to recover clock from the data received at an RI port and regenerate a system clock and reference clock for the mapped RI port so that the data is transmitted at the mapped RI port with the regenerated system clock and reference clock.

In one embodiment, the apparatus further comprises a framing/deframing module connecting to each RI port, and configured to convert high speed serial electrical signals received at an RI port to user plane data, control and management plane data and transmit the converted data to the switcher, and configured to convert data received from the switcher to high speed serial electrical signals and transmit the converted data to an RI port determined by the switcher.

In one embodiment, the apparatus further comprises a delay calculation and compensation unit configured to calculate the link delay between the RI port at which the data is received and the mapped RI port, and compensate the calculated link delay before the data is switched to the mapped RI port.

In one embodiment, the mapping relationship is embodied as a switching matrix, a table, an array, a set or a graph.

In one embodiment, the minimal processing and transmission unit is an Antenna-Carrier (AxC).

In one embodiment, the apparatus is included in an REC/RE or a separated device physically.

According to a second aspect, there is provided a method for use in an apparatus which comprises a plurality of Radio Interface (RI) ports, each connecting to a node of either a Radio Equipment Control (REC) or a Radio Equipment (RE), wherein at least one REC and at least one RE are connected to the apparatus via the RI ports. The method comprises receiving data via an RI port; and switching the data according to a mapping relationship between one or more minimal processing and transmission units of at least one REC and one or more minimal processing and transmission units of at least one RE.

According to a third aspect, there is provided a computer readable storage medium stored thereon computer instructions, which when executed on at least one processor, cause the at least one processor to execute the method according to the disclosure.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the disclosure, data of an REC/RE may be mapped to any RE/REC for further processing. A mapping relationship between one or more minimal processing and transmission units of at least one REC and one or more minimal processing and transmission units of at least one RE is preconfigured. When data are received at an RI port, the processing and transmission unit(s) over which the data are received can be determined firstly, and then the processing and transmission unit and the RI port the data should be mapped to can be determined by referring to the mapping relationship. The data is then switched to the determined RI port for further processing. The mapping relationship is adjustable. Accordingly, a flexible mapping relationship between RECs and REs are provided. It provides an efficient network planning and network expanding technique.

Figure 2:
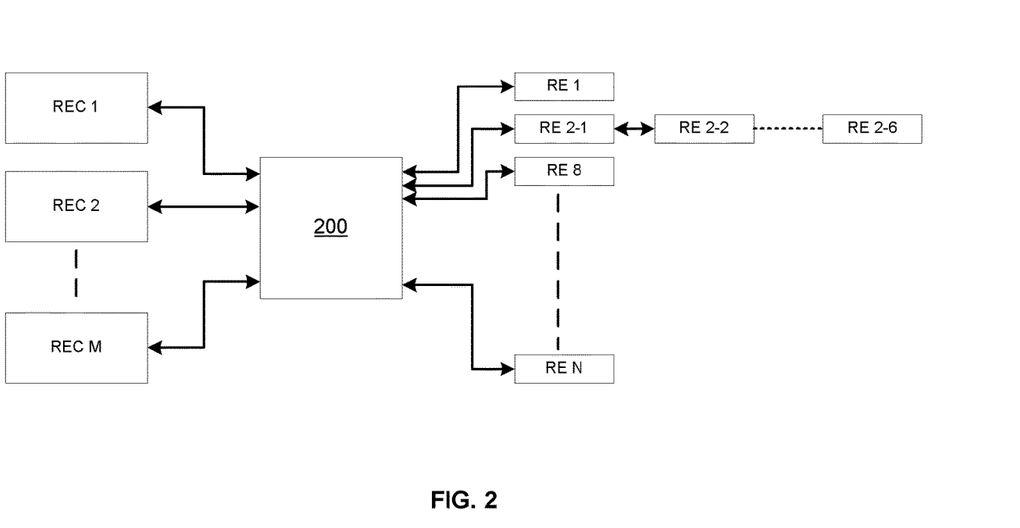
FIG. 2 illustrates a network topology in which an RI switching apparatus according to an embodiment of the disclosure is applied.
Figure 3:
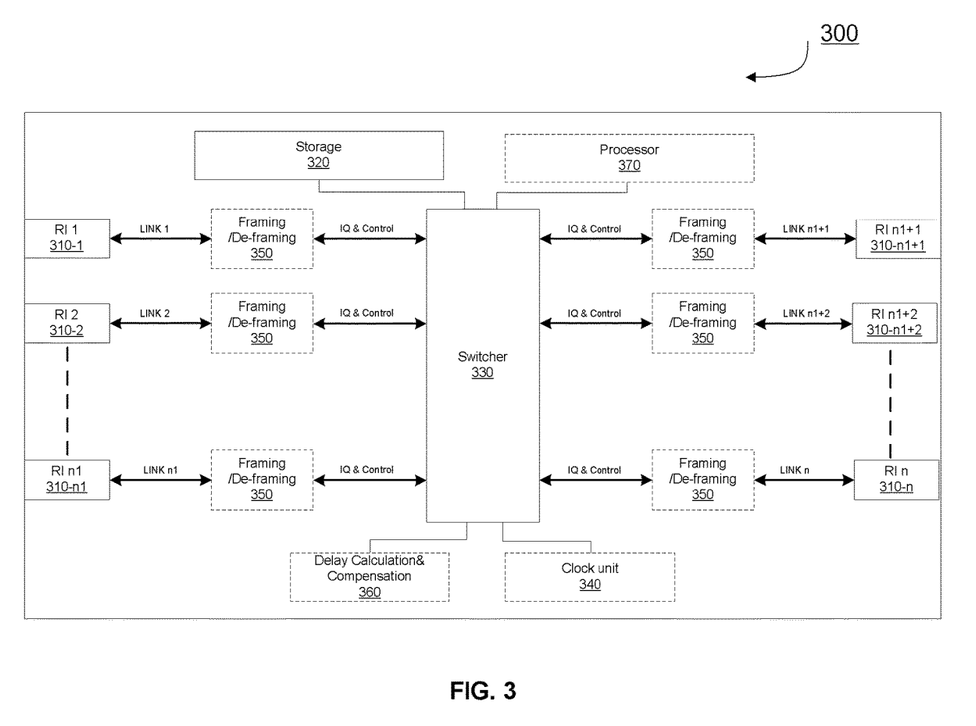
FIG. 3 illustrates a structural diagram of an RI switching apparatus according to an embodiment of the disclosure.

FIG. 2 illustrates a network topology in which an RI switching apparatus 200 according to an embodiment of the disclosure is applied, and FIG. 3 illustrates a structural diagram of an RI switching apparatus 300 according to an embodiment of the disclosure.

As shown in FIG. 2, the RI switching apparatus 200 connects to a number M of RECs and a number N of REs at its RI ports, and can switch data received at any RI port to another RI port. The numbers M and N may be any positive integer.

As shown in FIG. 3, the RI switching apparatus 300 according to an embodiment of the disclosure comprises a number n of RI ports 310-1 . . . 310-n, a storage 320, and a switcher 330. Each of the RI ports connects to either an REC or an RE, as shown in FIG. 2. Certainly, the RI switching apparatus may comprise one or more spare RI ports to which no node is connected. Since the spare RI ports are not involved in the operations according to the disclosure, and thus are not discussed and omitted in the disclosure. The deployment of the connection of RI ports to the REC(s) and RE(s) are based on the available RE pool and REC pool. For example, the operator of the apparatus will determine REs from the available RE pool that are capable of serving UEs, and then determine RECs from the available REC pool that can process data from the determined REs, and then design the network topology. At least one REC and at least one RE are connected to the RI ports to enable the switching which is described below. The storage 320 stores a mapping relationship between one or more minimal processing and transmission units of at least one REC and one or more minimal processing and transmission units of at least one RE. When the RI switching apparatus 300 receives data via an RI port, the switcher 330 switches the data to another RI port according to the mapping relationship.

As can be seen from FIG. 3, considering that an REC and an RE that are mapped to each other may have different system clocks, the RI switching apparatus 300 according to the embodiment of the disclosure may further comprise a clock unit 340 which is configured to recover clock from the data received at an RI port and regenerate a system clock and reference clock for the other RI port to which the data is to be switched, so that the data will be transmitted from the switched RI port to the node (e.g., an REC or RE) to which the switched RI port is connected with the regenerated system clock and reference clock.

Considering the CPRI standard that has specific framing requirements, as shown in FIG. 3, the RI switching apparatus 300 according to the embodiment of the disclosure may further comprise a framing/deframing module 350 which connects to each RI port, and is configured to convert high speed serial electrical signals received at an RI port to user plane data, control and management plane data and transmit the converted data to the switcher for switching. For the data switched by the switcher 330, the framing/deframing module 350 is further configured to convert user plane data, control and management plane data to high speed serial electrical signals and transmit the converted data to an RI port determined by the switcher 330. Although a number n of framing/deframing modules 350 are shown in FIG. 3, it should be understood that the shown framing/deframing modules may be integrated into one or more modules without limitation. Also, although the other components are shown to be one unit, it should be understood that the components may be distributed among more than one unit without limitation.

As can be seen from FIG. 3, considering the timing difference between different mapping relationship for switching data between an REC and an RE, the RI switching apparatus 300 according to the embodiment of the disclosure may further comprise a delay calculation and compensation unit 360 which is configured to calculate the link delay between the RI port at which the data is received and the mapped RI port, and compensate the calculated link delay before the data is switched to the mapped RI port.

As another alternative, as shown in FIG. 3, the RI switching apparatus 300 according to the embodiment of the disclosure may further comprise a processor 370 configured to receive information on the amount of minimal processing and transmission units of respective RI ports, and calculate and store in the storage the mapping relationship according to the information. The information may be received from the operator of the apparatus, or from another device, such as an upper layer node, e.g., a Radio Node Controller (RNC). As another alternative, a connected REC may calculate the mapping relationship and send information to inform the apparatus of the mapping relationship to be used. The apparatus receives information on the mapping relationship from the connected REC and stores the informed mapping relationship in the storage for later use. As another example, the connected REC may transmit information on the amount of minimal processing and transmission units of respective RI ports to the apparatus, and the processor of the apparatus calculates the mapping relationship instead. It depends on the processing capabilities of the REC and the apparatus and the network planning.

Figure 4:
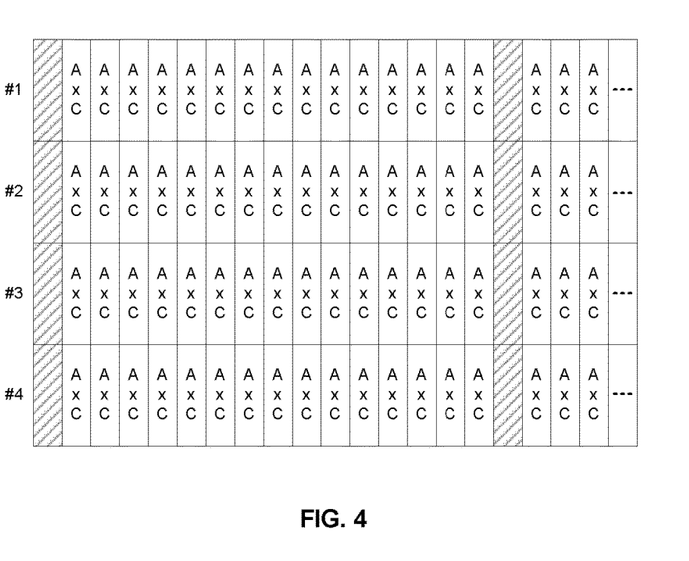
FIG. 4 shows an example structure of data received at an RI port according to an embodiment of the disclosure.

FIG. 4 shows an example structure of data received at an RI port according to an embodiment of the disclosure, where the white part denotes user plane data and the shaded part denotes control and management plane data. The number of rows depends on the data to be switched via RI ports.

It should be understood by those skilled in the art that the mapping relationship may be embodied as a switching matrix, a table, an array, a set, a graph, or any other data structure that maps one or more minimal processing and transmission units of an REC to one or more minimal processing and transmission units of an RE. Below an example of a switching matrix is given. It is obvious that the present disclosure is not limited to the example switching matrix.

Assume there are n ports each of which connects to either an RE or an REC. The corresponding switching matrix is designed to include n rows and n+1 columns, denote as SM. An element of SM is denoted as sm(i, j), i=1, 2, . . . , n; j=1, 2, . . . , n+1. Assume that node i, i.e., REC/RE i, has a processing and transmission capability of $m_i$ AxCs, where $\{0, 1, \ldots, m_i-1\}$ is the AxC index set of that REC/RE.

- sm(i, j) is a subset of the AxC index set of REC/RE i, which represents data transferred over AxCs indexed by sm(i, j) are switched to REC/RE j.
- sm(i, j) and sm(j, i) together define the mapping relationship between REC/RE i and REC/RE j: sm(i, j)←→sm(j, i).

In the switching matrix, sm(i, n+1) defines AxC(s) of REC/RE i that is not used/mapped, which means that no data will be transferred over the AxC(s) indexed by sm(i, n+1), and no data will be mapped to the AxC(s) of REC/RE i indexed by sm(i, n+1).

TABLE 1 switching matrix $$\begin{bmatrix} sm(1,1) & sm(1,2) & \cdots & sm(1,n) & sm(1,n+1) \\ sm(2,1) & \ddots & & & \vdots \\ \vdots & & \ddots & & \vdots \\ \vdots & & sm(i,j) & & \vdots \\ \vdots & & & \ddots & \vdots \\ sm(n,1) & \cdots & \cdots & sm(n,n) & sm(n,n+1) \end{bmatrix}_{n \times n+1}$$

When switching data transferred over AxCs between RECs and REs, not only the user plane data are switched, but also corresponding control and management plane data are switched.

In this part, we take the following radio access system as one example to describe the RI switching using the concept of the present disclosure. For the more complicated network with other processing and transmission capability options, the following method can be expanded easily.

The example radio access system includes the following units:
1. RECs with a processing and transmission capability of 8 AxCs
2. REs with a processing and transmission capability of 6 AxCs
3. REs with a processing and transmission capability of 2 AxCs Here it is discussed that RECs have more processing and transmission capabilities than RE. For the cases that RECs have less processing and transmission capabilities, it can be easily expanded.

Figure 5:
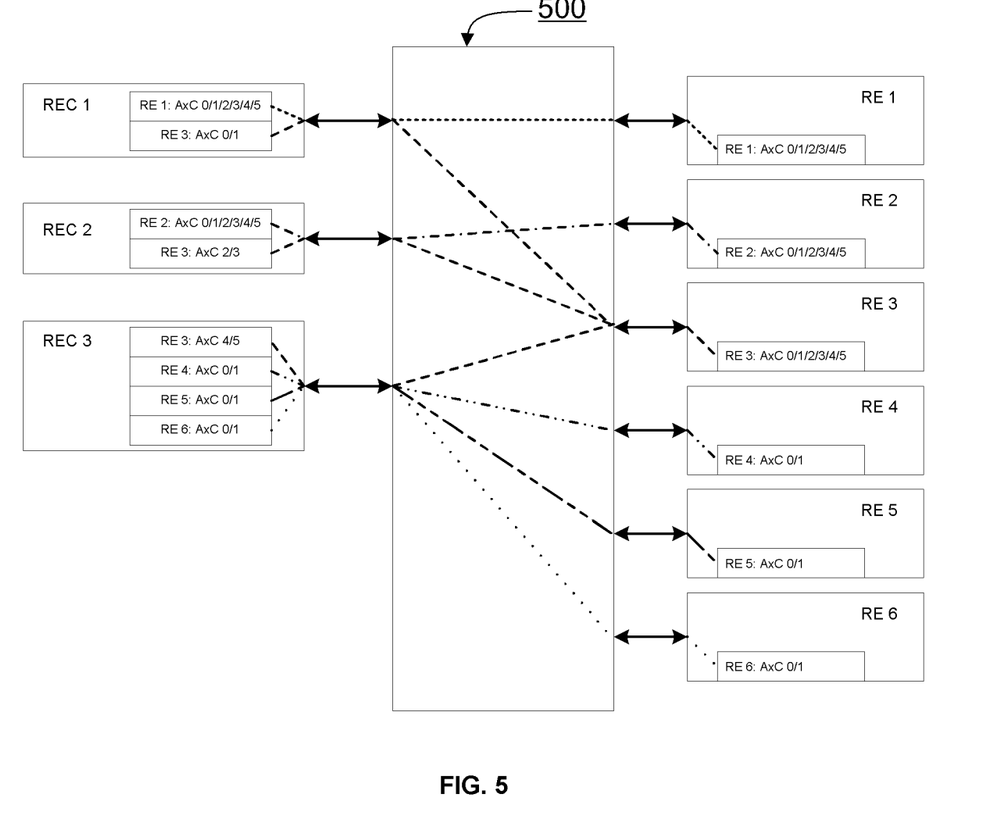
FIG. 5 illustrates a network topology in which an apparatus according to an embodiment of the present disclosure is applied.

FIG. 5 illustrates a network topology in which an apparatus according to an embodiment of the present disclosure is applied. The apparatus is denoted by 500 in FIG. 5. Three RECs, RECs 1-3 are connected and six REs, REs 1-6 are connected. The apparatus 500 have a total of 9 RI ports connected to either an RE or an REC.

Figure 6:
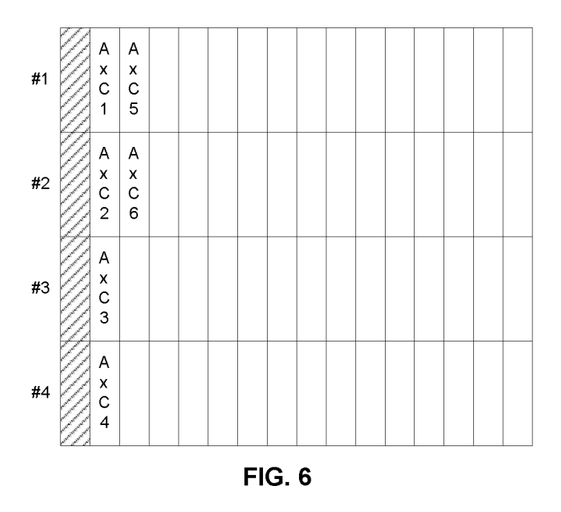
FIG. 6 shows an example data structure of REs 1-3 in the embodiment shown in FIG. 5.
Figure 7:
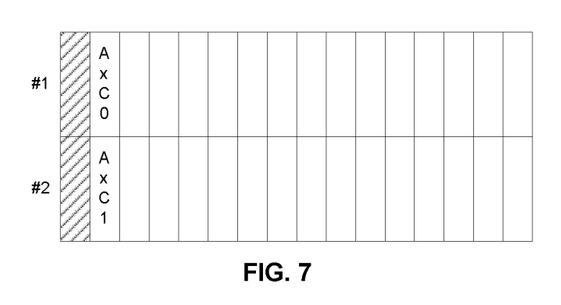
FIG. 7 shows an example data structure of REs 4-6 in the embodiment shown in FIG. 5.
Figure 8:
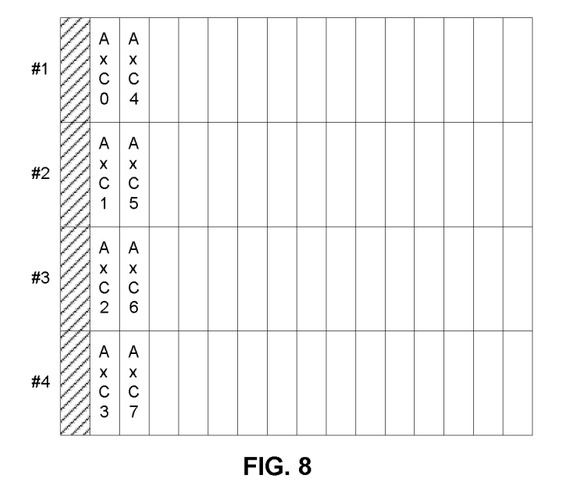
FIG. 8 shows an example data structure of RECs 1-3 in the embodiment shown in FIG. 5.

FIG. 6 shows an example data structure of RE 1, RE 2 and RE 3. FIG. 7 shows an example data structure of from RE 4, RE 5 and RE 6. FIG. 8 shows an example data structure of REC 1, REC 2 and REC 3.

If we number (REC 1, REC 2, REC 3, RE 1, RE 2, RE 3, RE 4, RE 5, RE 6) as (1, 2, 3, 4, 5, 6, 7, 8, 9), the switching matrix SM indicating the network topology as shown in FIG. 5 should be as the following table, where φ is an empty set. As all processing and transmission capabilities of RECs 1-3 and REs 1-6 are fully used, all elements in column 10 of SM are φ.

TABLE 2

Switching Matrix $$\begin{bmatrix} \phi & \phi & \phi & \{0,1,2,3,4,5\} & \phi & \{6,7\} & \phi & \phi & \phi & \phi \\ \phi & \phi & \phi & \phi & \{0,1,2,3,4,5\} & \{6,7\} & \phi & \phi & \phi & \phi \\ \phi & \phi & \phi & \phi & \phi & \{0,1\} & \{2,3\} & \{4,5\} & \{6,7\} & \phi \\ \{0,1,2,3,4,5\} & \phi & \phi & \phi & \phi & \phi & \phi & \phi & \phi & \phi \\ \phi & \{0,1,2,3,4,5\} & \phi & \phi & \phi & \phi & \phi & \phi & \phi & \phi \\ \{0,1\} & \{2,3\} & \{4,5\} & \phi & \phi & \phi & \phi & \phi & \phi & \phi \\ \phi & \phi & \{0,1\} & \phi & \phi & \phi & \phi & \phi & \phi & \phi \\ \phi & \phi & \{0,1\} & \phi & \phi & \phi & \phi & \phi & \phi & \phi \\ \phi & \phi & \{0,1\} & \phi & \phi & \phi & \phi & \phi & \phi & \phi \end{bmatrix}_{9 \times 10}$$

We use REC 1 and RE 1, RE 3 as an example to describe how to switch data based on the Switching Matrix.

The number of (REC 1, RE 1, RE 3) are (1, 4, 6), and the following elements of the Switching Matrix are related to these RECs/REs:

sm(1,4)={0,1,2,3,4,5};
sm(1,6)={6,7};
sm(4, 1)={0,1,2,3,4,5};
sm(6,1)={0,1}.

So the data of REC1, RE 1 and RE3 are mapped as following:

REC 1: AxC {0,1,2,3,4,5}←→RE 1: AxC {0,1,2,3,4,5};
REC 1: AxC {6,7}←→RE 4: AxC {0,1}.

In the embodiment, control and management plane data corresponding to AxCs are switched together with user plane data over the same AxCs.

In the example, the switching matrix as shown in table 2 is stored in the storage 320. If the apparatus 300 receives data at an RI port, for example, at the RI port connecting to RE 1 over AxC 0. The switcher 330 in the apparatus refers to the stored switching matrix, and finds that AxC 0 at the port connecting to RE 1 should be mapped to AxC 0 at the port connecting to REC 1 according to the elements sm(4,1) and sm(1,4), and thus switches the received data to the mapped port, so as to transmit the data over AxC 0 to REC 1. Similarly, when the apparatus 300 receives data at the RI port connecting to REC 1 over AxC 6, the switcher 330 refers to the switching matrix, and finds that AxC 6 at the port connecting to REC 1 should be mapped to AxC 0 at the port connecting to RE 3 according to the elements sm(1,6)

and sm(6,1), and thus switches the received data to the mapped port, so as to transmit the data over AxC 0 to RE 3.

From the example, it can be seen that a more flexible mapping between RECs and REs is achieved with the RI switching apparatus according to the disclosure. With an appropriate mapping relationship, the processing and transmission capabilities of RECs and REs can be used to the best. In the example, three RECs can process data from six REs. Contrarily, if a direct connection between RECs and REs as shown in FIG. 1 is used, three more RECs are needed to process data from six REs.

Figure 9:
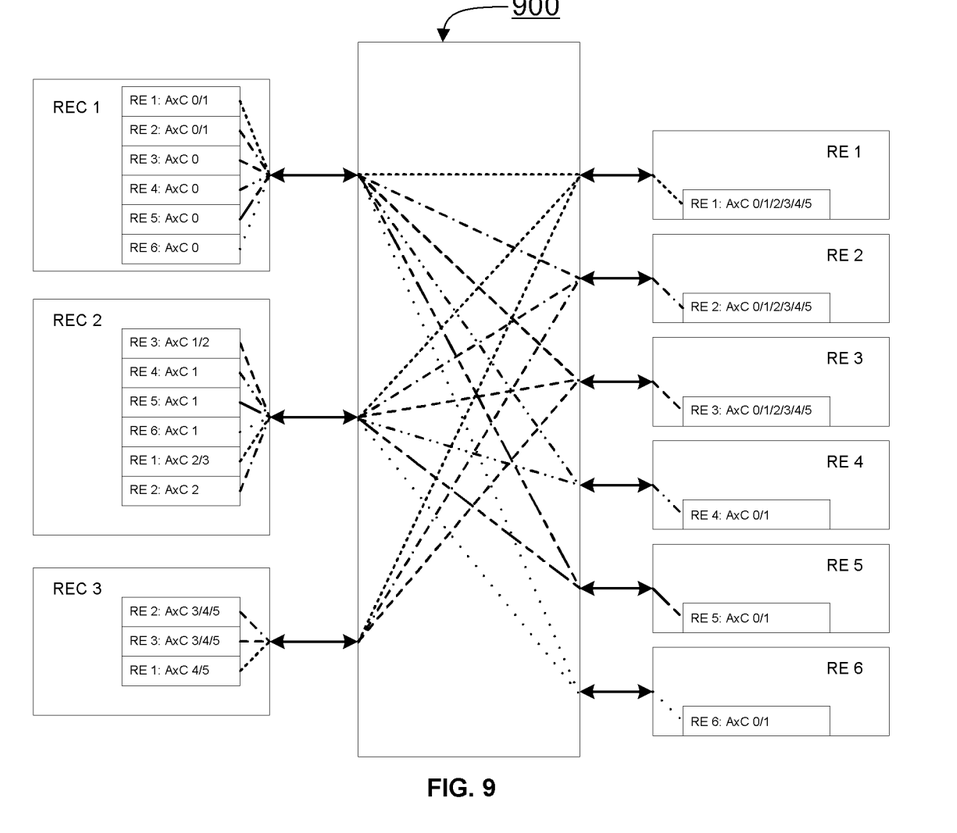
FIG. 9 illustrates a network topology in which an apparatus according to an embodiment of the present disclosure is applied.

FIG. 9 illustrates a network topology in which an RI switching apparatus according to an embodiment of the present disclosure is applied. The apparatus is denoted by 900 in FIG. 9. The REC pool and the RE pool available are the same as those in FIG. 5. That is, the available RECs and REs, and processing and transmission capabilities of the connected RECs and REs are the same. For simplicity, the connections of the RI ports to RECs and REs in FIG. 9 are shown to be the same as those in FIG. 5. The only difference is in the mapping relationship. The operator can pre-configure an appropriate mapping relationship according to the processing and transmission capabilities of the available RECs and REs and store it in the storage.

In an embodiment of the disclosure, the mapping relationship depends on the connections of respective RI ports to nodes and minimal processing and transmission unit deployment at respective RI ports. In an embodiment, the apparatus, for example the processor of the apparatus, detects that the connections of respective RI ports to nodes change or the minimal processing and transmission unit deployment at respective RI ports changes, and calculates a new mapping relationship. In another embodiment, an REC is informed of the change, and recalculates the mapping relationship and informs the apparatus of the calculated result. As another example, the operator may pre-configure a different mapping relationship to the apparatus in the case that the change occurs.

In still another embodiment, the storage of the apparatus may store more than one piece of mapping relationship, for example that one indicating the network topology shown in FIG. 5 and that one indicating the network topology shown in FIG. 9, and selects an appropriate one to use at a time. For example, on idle hours like midnight when the demand of user traffic is not so much, each RE can only setup one AxC to serve user. In this scenario, the processor of the apparatus chooses the mapping relationship indicating the topology as shown in FIG. 9. In such a case, REC 1 can be used to process these AxCs of RE 1-6, while REC 2 and REC 3 can turn into idle/sleep mode to save the power consumption. As another example, the operator may configure the apparatus to use the mapping relationship indicating the network topology shown in FIG. 5 at daytime and use the mapping relationship indicating the network topology shown in FIG. 9 at night. In order to enable power saving in idle hours, the mapping relationship should be configured so that when the REs use less minimal processing and transmission units to serve lower user traffic, the number of RECs whose minimal processing and transmission units are mapped to the un-used minimal processing and transmission units of the REs is as much as possible.

In an embodiment, when calculating/configuring the mapping relationship, in order to make the best of the processing and transmission capabilities of the RECs and REs, the mapping relationship is configured to keep the amount of un-mapped minimal processing and transmission units of connected REC and connected RE to a minimum. As shown in FIGS. 5 and 9, all AxCs of connected RECs and REs are involved in mapping. In other words, there is no un-mapped minimal processing and transmission unit of connected REC and connected RE in the network topology. The switching matrix in table 2 indicates this with all the elements in column 10 being $\phi$.

In an embodiment, the mapping relationship is configured so that more than one RI port connecting to a plurality of REs that operate at the same frequency is mapped to the same RI port to which an REC is connected. For the network topology shown in FIG. 5, if RE 4, RE 5 and RE 6 are working at the same frequency, using the apparatus of the disclosure can provide one way to implement logic receiving diversity because they are switched to the same REC, i.e., REC 3.

Carrier Aggregation technology is used to increase bandwidth, and thereby increase the bitrates. If the apparatus according to the present disclosure is applied, we can flexibly aggregate any carriers from different REs by configuring the mapping relationship so that specified minimal processing and transmission units from different REs are mapped to the same REC. The mapping between an RE and an REC does not depend on the connection therebetween, but on the mapping relationship applied. The mapping relationship is adjustable and flexible. The benefit of carrier aggregation can be used to the most extent with an appropriate mapping relationship.

Figure 10:
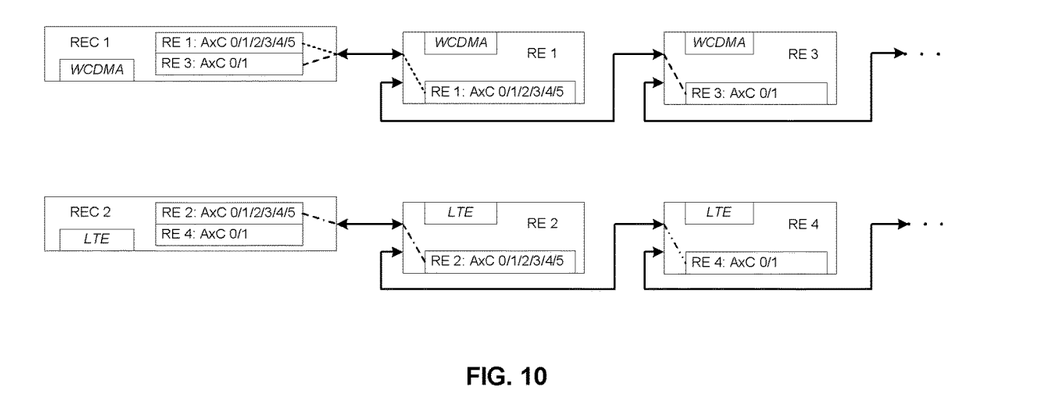
FIG. 10 illustrates a network topology without the switching according to the present disclosure.
Figure 11:
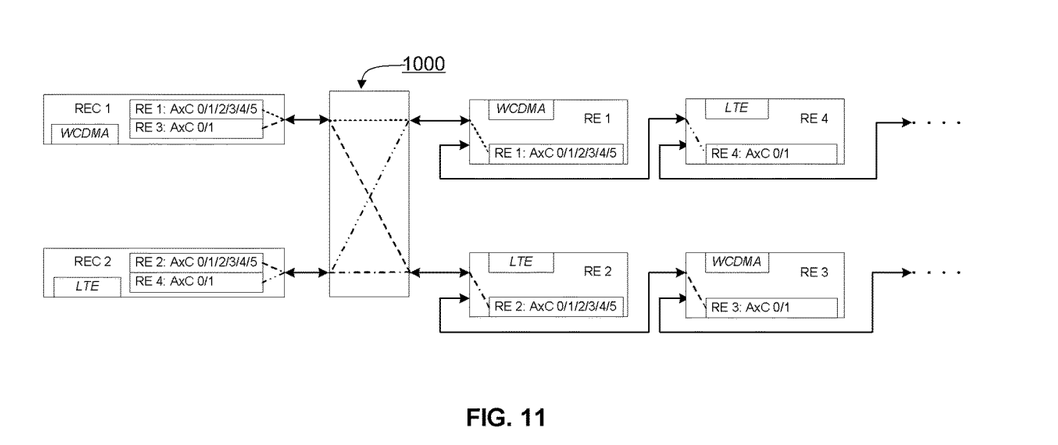
FIG. 11 illustrates a cascading network topology in which an apparatus according to an embodiment of the present disclosure is applied.

REC/RE cascading is widely used in the network topology to increase the site deployment flexibility. The REC and RE may support different telecommunication standards, such as GSM, TD-SCDMA, WCDMA, LTE and etc. For the current network topology without switching of the present disclosure, only REC/REs support the same telecommunication standard can be connected/cascaded, as shown in FIG. 10, which illustrates a cascading network topology without the RI switching according to the present disclosure. If the RI switching of the present disclosure is applied in the network, the connection/cascading method between REC/RE are flexible since all minimal processing and transmission units are switched according to the mapping relationship and there is no fixed connection between any REC and any RE. The mapping relationship is configured so that data received at an RI port is switched to another RI port to which a node that supports the same telecommunication standard with the received data is connected. The mapping between an RE and an REC does not depend on the connection therebetween, but on the mapping relationship applied. FIG. 11 illustrates a cascading network topology in which an RI switching apparatus according to an embodiment of the present disclosure is applied. The apparatus is denoted as 1100 in the figure. As shown in FIG. 11, RE 4 which supports LTE may connect to the apparatus via RE 1 which supports a different telecommunication standard, WCDMA. Data from RE 4 are switched to REC 2 which supports the same telecommunication standard by the RI switching apparatus according to the present disclosure, and data from RE 1 are transferred to REC 1 which supports the same telecommunication standard by the RI switching apparatus according to the present disclosure. The application of the RI switching apparatus according to the present disclosure dramatically increases site deployment and upgrade flexibility.

In an embodiment, the apparatus may be included in an REC/RE. In another embodiment, the apparatus is embodied as a separated device physically. As an example, if the apparatus is included in an REC/RE, the clock unit and framing/deframing module in an existing REC/RE can be reused. The REC/RE is only updated to store the mapping relationship in its storage, and comprise a switcher to achieve the switching operation and a delay calculation and compensation unit, so as to implement the function of the apparatus according to the disclosure.

In the above example, for an apparatus with 9 RI ports, a switching matrix of n rows and n+1 columns is given as an example of the mapping relationship. The present disclosure is not limited thereto. For example, two switching matrix, first one with 3 rows and 6 columns, the second one with 6 rows and 3 columns, may be designed for 3 RECs and 6 REs. As another example, a switching matrix of n rows and n columns may be designed which has elements corresponding to those of column 1-n in the switching matrix shown in table 2 since the last $(n+1)^{th}$ column is not involved in the mapping between RI ports. It should be understood by one skilled in the art that the mapping relationship may be stored in other forms, such as a table, an array, a set, a graph, or others. The data structures shown in FIGS. 6-8 are also given as an example, and the disclosure is not limited thereto.

Figure 12:
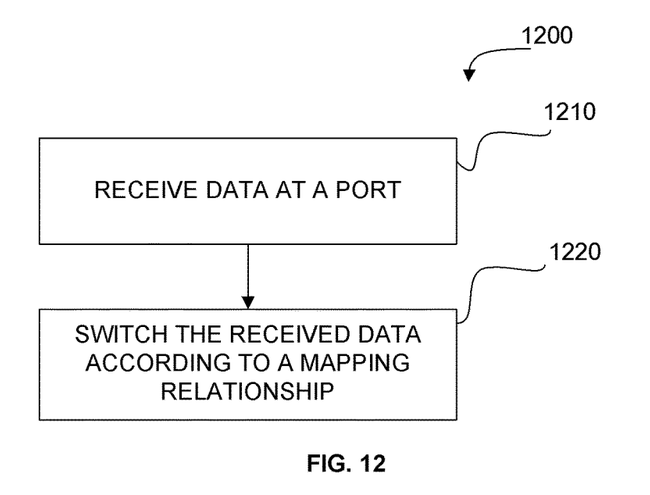
FIG. 12 illustrates a flowchart of an RI switching method according to an embodiment of the disclosure.

FIG. 12 illustrates a flowchart of an RI switching method 1200 according to an embodiment of the disclosure. The method 1200 occurs at an apparatus comprising a plurality of RI ports. Each RI port connects to either an REC or an RE. At least one REC and at least one RE are connected to the apparatus. At step 1210, the apparatus receives data at an RI port. Then at step 1220, the data are switched according to a mapping relationship which indicates data mapping between one or more minimal processing and transmission units of at least one REC and one or more minimal processing and transmission units of at least one RE. The data are then transferred from the switched port to the node connecting to the switched RI port over the mapped one or more minimal processing and transmission units. For example, for the network topology shown in FIG. 5, the mapping relationship is configured so that data received at the RI port connecting to REC 1 over AxC 6 are switched to the port connecting to RE 3 and transferred to RE 3 over AxC 0. In another example, data received at the port connecting to RE 1 over AxC 0 are switched to the port connecting to REC 1 and transferred to REC 1 over AxC 0.

The mapping relationship may be pre-configured by the operator according to the processing and transmission capabilities of available RECs and REs when the network is initially setup. Alternatively, the mapping relationship may be calculated by the apparatus itself, received from an REC, or received from an upper layer node. In an embodiment, the apparatus receives information on amount of minimal processing and transmission units of respective RI ports, for example from an REC or an upper layer node, and then calculates the mapping relationship according to the information. In another embodiment, the REC obtains information on the amount of minimal processing and transmission units of respective RI ports and calculates the mapping relationship, and transmits the calculation result to the apparatus. The apparatus receives the mapping relationship from the REC and stores it for later use.

The method may further comprise changing the mapping relationship if the connections of respective RI ports to nodes change or minimal processing and transmission unit deployment at respective RI ports changes. The apparatus or an connected REC may re-calculate a mapping relationship when the connections change or processing and transmission unit deployment changes. As another example, the operator may pre-configure a different mapping relationship to the apparatus when the connections changes or minimal processing and transmission unit deployment changes. In an embodiment, the apparatus may store more than one piece of mapping relationship, for example that one indicating the topology shown in FIG. 5 and that one indicating the topology shown in FIG. 9, and choose an appropriate mapping relationship according to the current connections of RI ports to nodes or minimal processing and transmission unit deployment. For example, the apparatus may be configured to use the mapping relationship indicating the network topology shown in FIG. 5 at daytime and use the mapping relationship indicating the network topology shown in FIG. 9 at night.

In an embodiment, considering that an REC and an RE that are mapped to each other may have different system clocks, the method may comprise recovering a clock from the received data and regenerating a system clock and reference clock for a mapped RI port so that the data is transmitted from the mapped RI port with the regenerated system clock and reference clock. In another embodiment, for example considering the CPRI standard that has specific framing requirements, the method may comprise converting high speed serial electrical signals received at an RI port to user plane data, control and management plane data before switching the received data, and converting user plane data, control and management plane data to high speed serial electrical signals before transmitting the data from the mapped RI port. In still another embodiment, considering the timing difference between different mapping relationship, the method may comprise calculating the link delay between the RI port at which the data is received and the mapped RI port, and compensating the calculated link delay before switching the received data to the mapped RI port, so that the node connecting to the mapped RI port can correctly receive the data.

It will be understood by those skilled in the art that the present disclosure is not limited to the CPRI standard. The apparatus and method according to the disclosure are applicable to any other standards where there is no conflict.

Figure 13:
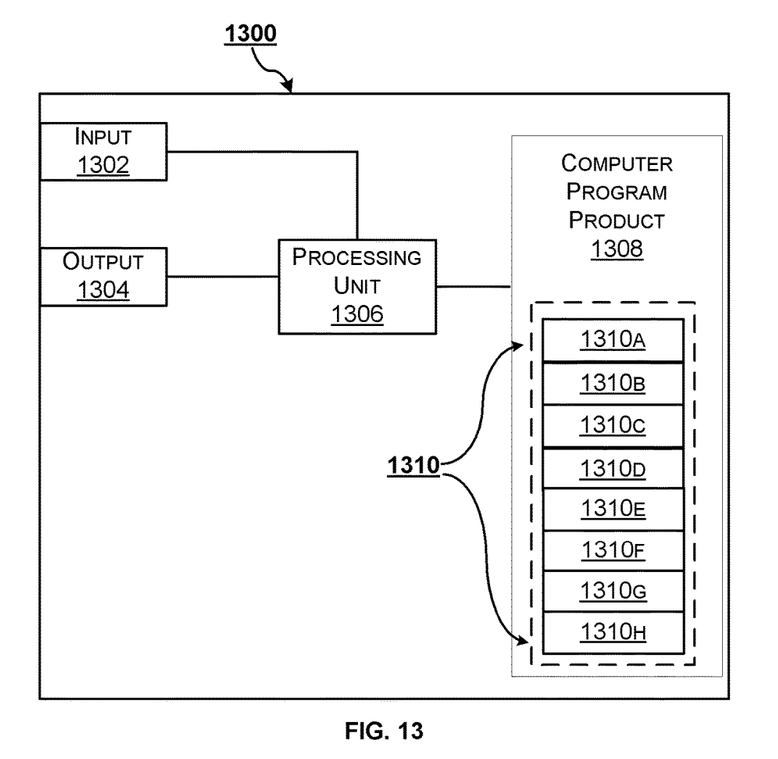
FIG. 13 schematically shows an embodiment of an arrangement which may be used in the RI switching apparatus according to the disclosure.

FIG. 13 schematically shows an embodiment of an arrangement 1300 which may be used in the RI switching apparatus according to the disclosure. Comprised in the arrangement 1300 are here a processing unit 1306. The processing unit 1306 may be a single unit or a plurality of units to perform different actions/functions described herein. The arrangement 1300 may also comprise an input unit 1302 for receiving signals from other entities, and an output unit 1304 for providing signal(s) to other entities. The input unit and the output unit may be arranged as an integrated entity.

Furthermore, the arrangement 1300 comprises at least one computer program product 1308 in the form of a non-volatile or volatile memory, e.g., an Electrically Erasable Programmable Read-Only Memory (EEPROM), a flash memory and a hard drive. The computer program product 1308 comprises a computer program 1310, which comprises code/computer readable instructions, which when executed by the processing unit 1306 in the arrangement 1300 causes the arrangement 1300 and/or the RI switching apparatus in which it is comprised to perform the actions, e.g., of the procedure described earlier in conjunction with FIG. 12.

The computer program 1310 may be configured as a computer program code structured in computer program modules 1310A 1310H. Hence, in an exemplifying embodiment when the arrangement 1300 is used in the RI switching apparatus according to the disclosure, the code in the computer program of the arrangement 1300 includes a receiving module 1310A for receiving data via a port. The code in the computer program 1310 further includes a switching module 13106, for switching the received data, by using the mapping relationship. The code in the computer program 1310 may further include a determining module 1310C, for changing the mapping relationship if a change of the deployment of the apparatus is detected. For example, the connections of respective RI ports to node change. It may be the case that the available RECs or REs change. As another example, the minimal processing and transmission unit deployment at respective RI ports changes. It may be the case that the processing and transmission capability of connected REC(s) or RE(s) changes. For example, a connected REC is replaced with another REC with a different processing and transmission capability. As another example, a connected RE uses more or less minimal processing and transmission units to serve UEs. That is, the amount of minimal processing and transmission units of the RE involved in mapping changes. The processing and transmission capability used herein refers to the amount of minimal processing and transmission units of an REC or an RE that are actually used and thus involved in mapping. The code in the computer program 1310 may further include a mapping relationship calculation module 1310D, for obtaining information on amount of minimal processing and transmission units of respective RI ports and calculating a mapping relationship according to the information. The code in the computer program 1310 may comprise further modules, illustrated as module 1310E, e.g. for receiving a mapping relationship from outside and storing it for later use. The code in the computer program of the arrangement 1300 may further include a clock recovering module 1310F for recovering a clock from the data received and regenerating a system clock and reference clock for a mapped port. The code in the computer program 1310 may further include a converting module 1310G for converting data from high speed serial electrical signals to user plane data, control and management plane data and from user plane data, control and management plane data to high speed serial electrical signals. The code in the computer program 1310 may further include a converting module 1310H for calculating a link delay between two ports that are mapped to each other, and compensating the link delay.

The computer program modules could essentially perform the actions of the flow illustrated in FIG. 12, to emulate the RI switching apparatus according to the disclosure.

Although the code means in the embodiments disclosed above in conjunction with FIG. 13 are implemented as computer program modules which when executed in the processing unit causes the processing unit to perform the actions described above in conjunction with the figures mentioned above, at least one of the code means may in alternative embodiments be implemented at least partly as hardware circuits.

The processing unit 1306 may be a single CPU (Central processing unit), but could also comprise two or more processing units. For example, the processing unit may include general purpose microprocessors; instruction set processors and/or related chips sets and/or special purpose microprocessors such as Application Specific Integrated Circuit(ASICs), Field Programmable Gate Array(FPGAs) or Digital Signal Processing(DSPs). The processing unit may also comprise board memory for caching purposes. The computer program may be carried by a computer program product connected to the processing unit. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the RI switching apparatus.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

In this disclosure, although terminologies from radio access network systems have been used to exemplify the embodiments, this should not be seen as limiting the scope of the disclosure to only the aforementioned system. Other systems and devices that can also benefit from the present disclosure shall be encompassed within the scope of the present disclosure. Given the rapid development in communications, there will of course also be future type communications system with which the present disclosure may be embodied.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. An apparatus for Radio Interface (RI) switching in a wireless communication network, the apparatus comprising:
  a plurality of RI ports, each connected to a node of either a Radio Equipment Control (REC) or a Radio Equipment (RE), wherein at least one REC and at least one RE are connected to the apparatus via the plurality of RI ports;
  a processor configured to:
  receive, from a radio network controller (RNC), information on an amount of minimal processing and transmission units of respective RI ports, and
  calculate a mapping relationship based on the received information, wherein the mapping relationship indicates data mapping between one or more minimal processing and transmission units of the at least one REC and one or more minimal processing and transmission units of the at least one RE;
  a storage configured to store the mapping relationship between the one or more minimal processing and transmission units of the at least one REC and the one or more minimal processing and transmission units of the at least one RE, wherein each of the one or more minimal processing and transmission units is an Antenna-Carrier (AxC); and
  a switcher configured to switch data received at an RI port, of the plurality of RI ports, to another RI port, of the plurality of RI ports, based on the mapping relationship.

2. The apparatus according to claim 1, wherein the mapping relationship depends on the connections of the respective RI ports to nodes and minimal processing and transmission unit deployment at the respective RI ports.

3. The apparatus according to claim 1, wherein the mapping relationship is configured to keep an amount of un-mapped minimal processing and transmission units of the at least one REC, connected to the apparatus, and the at least one RE, connected to the apparatus, to a minimum.

4. The apparatus according to claim 1, wherein the mapping relationship is configured such that more than one RI port, of the plurality of RI ports, connected to REs that operate at same frequency is mapped to same RI port, of the plurality of RI ports, to which an REC is connected.

5. The apparatus according to claim 1, wherein the mapping relationship is configured such that specified minimal processing and transmission units from different REs are mapped to minimal processing and transmission units of same REC.

6. The apparatus according to claim 1, wherein the mapping relationship is configured such that data received at an RI port, of the plurality of RI ports, is switched to another RI port, of the plurality of RI ports, to which a node that supports same telecommunication standard with the received data is connected.

7. The apparatus according to claim 1, further comprising:
a clock unit configured to recover clock from the data received at the RI port and regenerate a system clock and reference clock for a mapped RI port, of the plurality of RI ports, such that the data is transmitted at the mapped RI port with the regenerated system clock and reference clock.

8. The apparatus according to claim 1, further comprising:
a framing/deframing module connected to each RI port, and configured to convert high speed serial electrical signals received at an RI port, of the plurality of RI ports, to user plane data, control and management plane data and transmit the converted data to the switcher, and further configured to convert data received from the switcher to high speed serial electrical signals and transmit the converted data to an RI port, of the plurality of RI ports, determined by the switcher.

9. The apparatus according to claim 7, further comprising:
a delay calculation and compensation unit configured to calculate a link delay between the RI port at which the data is received and the mapped RI port, and compensate the calculated link delay before the data is switched to the mapped RI port.

10. The apparatus according to claim 1, wherein the mapping relationship is embodied as a switching matrix, a table, an array, a set, or a graph.

11. The apparatus according to claim 1, wherein the apparatus is included in an REC/RE or a separated device physically.

12. A method for use in an apparatus which comprises a plurality of Radio Interface (RI) ports, each RI port connecting to a node of either a Radio Equipment Control (REC) or a Radio Equipment (RE), wherein at least one REC and at least one RE are connected to the apparatus via the plurality of RI ports, the method comprising:
receiving data via an RI port of the plurality of RI ports;
receiving, from a radio network controller (RNC), information on an amount of minimal processing and transmission units of respective RI ports;
calculating a mapping relationship based on the received information, wherein the mapping relationship indicates data mapping between one or more minimal processing and transmission units of the at least one REC and one or more minimal processing and transmission units of the at least one RE; and
switching the data according to the mapping relationship between the one or more minimal processing and transmission units of the at least one REC and the one or more minimal processing and transmission units of the at least one RE, wherein each of the one or more minimal processing and transmission units is an Antenna-Carrier (AxC).

13. The method according to claim 12, further comprising changing the mapping relationship if the connections of the respective RI ports to nodes change or minimal processing and transmission unit deployment at the respective RI ports changes.

14. The method according to claim 12, wherein the mapping relationship is configured to keep an amount of un-mapped minimal processing and transmission units of the at least one REC, connected to the apparatus, and the at least one RE, connected to the apparatus, to a minimum.

15. The method according to claim 12, wherein the mapping relationship is configured such that more than one RI port, of the plurality of RI ports, connecting to REs that operate at same frequency is mapped to same RI port, of the plurality of RI ports, to which an REC is connected.

16. The method according to claim 12, wherein the mapping relationship is configured such that specified minimal processing and transmission units from different REs are mapped to minimal processing and transmission units of same REC.

17. The method according to claim 12, wherein the mapping relationship is configured such that data received at an RI port, of the plurality of RI ports, is switched to another RI port, of the plurality of RI ports, to which a node that supports same telecommunication standard with the received data is connected.

18. The method according to claim 12, further comprising: recovering a clock from the data received at the RI port and regenerating a system clock and reference clock for a mapped RI port, of the plurality of RI ports, such that the data is transmitted at the mapped RI port with the regenerated system clock and reference clock.

19. The method according claim 12, further comprising:
converting high speed serial electrical signals received at an RI port, of the plurality of RI ports, to user plane data, control and management plane data before switching; and
converting the user plane data, control and management plane data to high speed serial electrical signals before transmitting.

20. The method according to claim 18, further comprising: calculating a link delay between the RI port at which the data is received and the mapped RI port, and compensating the calculated link delay before the data is switched to the mapped RI port.

21. The method according claim 12, wherein the mapping relationship is embodied as a switching matrix, a table, an array, a set, or a graph.

22. A computer readable storage medium having stored thereon computer instructions, which when executed on at least one processor, cause the at least one processor to execute the method of claim 12.

* * * * *